United States Patent [19]
Powell

[11] Patent Number: 5,198,729
[45] Date of Patent: Mar. 30, 1993

[54] CRT MONITOR WITH ELIMINATION OF UNWANTED TIME VARIABLE ELECTRIC FIELD

[75] Inventor: Robert J. Powell, St. Charles, Ill.

[73] Assignee: Display Technologies, Inc., Elgin, Ill.

[21] Appl. No.: 907,686

[22] Filed: Jul. 2, 1992

[51] Int. Cl.$^5$ .......... G09G 1/04; H01J 29/06; H01J 31/00; H01H 1/00
[52] U.S. Cl. .................. 315/370; 315/8; 315/85; 313/479; 335/214
[58] Field of Search ............ 315/8, 85, 370, 371; 335/214; 313/479, 477 R, 477 HC

[56] References Cited
U.S. PATENT DOCUMENTS

| | | | |
|---|---|---|---|
| 4,996,461 | 2/1991 | Bentley | 315/8 |
| 5,025,490 | 6/1991 | Tamura | 313/479 |

FOREIGN PATENT DOCUMENTS 0108156 8/1980 Japan .................. 313/479

OTHER PUBLICATIONS

Cappels, "Cancellation of ELF/VLF Electric Fields from CRT Displays" SID Digest 1992 pp. 137-140.

Primary Examiner—Gregory C. Issing
Attorney, Agent, or Firm—Margaret Marsh Parker

[57] ABSTRACT

Unwanted electric fields in the area in front of a CRT can be produced by flyback voltage pulses which occur across the horizontal deflection coils and are coupled to the inner DAG coating of the CRT. The unwanted fields can be eliminated by providing voltage pulses equal and opposite to the causative voltage pulses and applying the provided voltage pulses to the inner coating and the anode button, leaving no fields to be cancelled in the relevant area.

6 Claims, 3 Drawing Sheets

CRT MONITOR WITH ELIMINATION OF UNWANTED TIME VARIABLE ELECTRIC FIELD

BACKGROUND OF THE INVENTION

This invention relates to the field of cathode ray tubes (CRT) for monitors, TV, etc., and particularly to the prevention of radiation exposure for the CRT monitor operator through elimination of the causative electric fields.

As is well known, all electrical and electronic devices employing time-varying, high voltages emit electric fields unless the fields are cancelled or eliminated in some fashion. In CRT's as used in display monitors and television sets, a measurable field can be generated by the flyback voltage pulses from the horizontal deflection circuitry being coupled to the inner coating of the CRT. With the growing use of CRT monitors in many business and recreation activities, concern has also grown about possible danger to the operator from emitted electric fields although little is known about the actual effects of such fields. Some countries have already set up requirements as to the allowable amount of radiated field in the area in front of and surrounding the CRT monitor; other countries are in the process of doing so. Therefore, manufacturers of monitors are attempting to achieve acceptable radiation levels according to known measuring protocols.

The most common way of reducing radiation in the area adjacent to the operator has been to provide a conductive, grounded panel on the faceplate of the monitor. Such panels usually include an extremely thin coating of indium-tin oxide, applied in a vacuum by a very critical processing technique. The coating is applied to a separate, curved precision panel of glass which is then resin-bonded to the outer surface of the CRT faceplate. While this method is generally satisfactory, it is relatively expensive to produce and does have an undesirable effect on monitor quality.

A different approach has been described in the literature which attempts to "cancel" any electric field in front of a CRT. In this method the unwanted fields are partially cancelled by, for example, providing radiators on the front of the CRT, adjacent the picture area. A pickup or sensor is provided to sense any field signal in that area, amplifying and inverting the sensed signal and coupling it to the radiators to produce an opposing field. Other positions of the radiators are discussed. It is suggested that, while the requirements of a specific measurement protocol may be met by a particular radiator design, there may also be relatively large lobes of radiated signal in areas between the required points of measurement. In summary, it is apparent that, while this type of cancellation method is less expensive than previous shielding methods, it leaves much to be desired since creating a "cancellation" field cannot provide overall elimination of the unwanted radiation as is needed. A better approach is therefore still needed.

SUMMARY OF THE INVENTION

It is an object of the present invention to provide a means of essentially eliminating any electric field radiation to which a CRT monitor operator might be exposed.

It is a particular object to provide such means at a cost considerably less than presently used radiation reduction means.

These objects and others which will become apparent are obtained in the present invention by generation of voltage pulses having very similar or equal amplitude and opposite polarity to the undesired voltage pulses on the anode/metallization derived from the horizontal deflection signal and coupling the generated voltage pulses to the inner metallization of the tube, effectively preventing the generation of any induced field outside the CRT monitor, rather than attempting to cancel an existing field.

DETAILED DESCRIPTION OF THE PREFERRED EMBODIMENT

Figure 1:
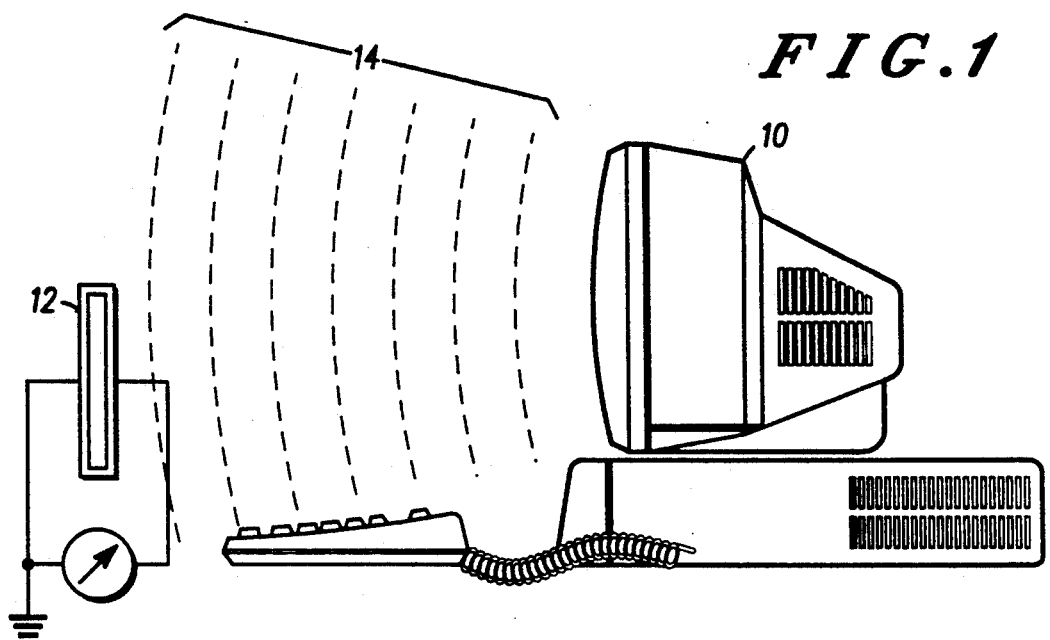
FIG. 1 is a side view of a CRT monitor showing the area of possible radiation danger.

In FIG. 1 may be seen a typical CRT monitor 10 in a normal operating situation and illustrating the area of possible danger. A measuring antenna 12 may be positioned as required for a particular measurement protocol. The invisible radiation emanating from the monitor is represented by the dotted lines 14. In most monitors this radiation is minimal but even a suggestion of radiation could be considered a hazard in the marketing of a monitor.

Figure 2:
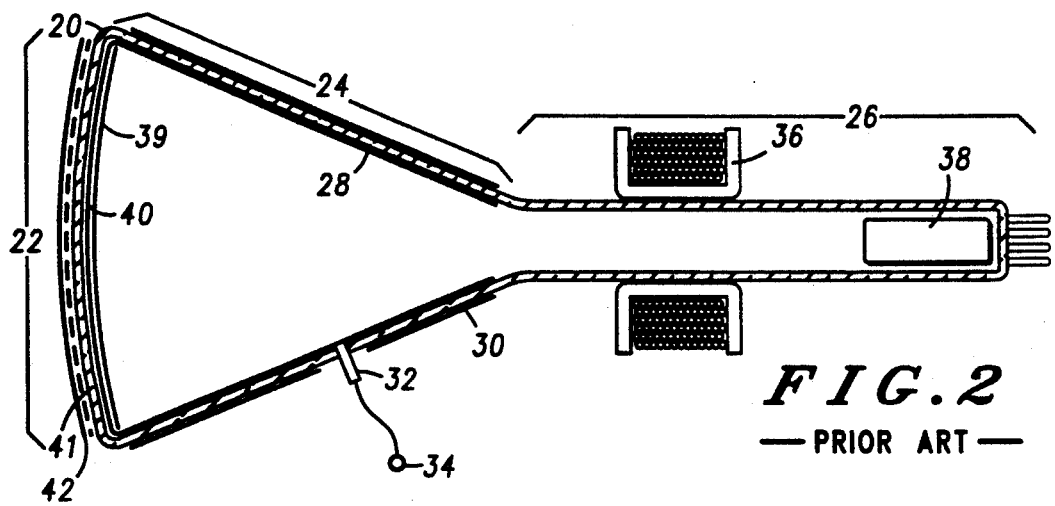
FIG. 2 is a diagram of a monitor showing the typical means of reducing radiation in the prior art.

In FIG. 2, a cutaway view (not to scale) of a prior art CRT monitor tube shows the means of reducing radiation generally used at present. The glass envelope 20 is made up of a faceplate portion 22, a funnel portion 24 and a neck portion 26. The funnel portion 24 has two conductive coatings, an inner layer 28 and an outer layer 30, both layers typically being formed of colloidal graphite known as DAG or AQUADAG. The outer conductive layer 30 is electrically grounded, and is spaced away from an anode button 32. The inner conductive layer 28 is connected to the anode button which receives a high voltage from an external circuit (not shown) via a connection 34. Around part of the neck portion 26 is a deflection yoke 36 which provides the time-varying fields for deflecting the electron beams from an electron gun 38 (three in the case of a color monitor) in the neck portion 26. The electron beams are directed (through a mask 39 in a color monitor) to a layer of phosphors 40 on the inner side of the faceplate portion 22.

It is the horizontal flyback voltage pulses which occur across the horizontal deflection coils which can, by coupling to the inner DAG coating 28, induce an unwanted electric field in the area in front of the CRT tube. In this prior art method, the electric field is mostly eliminated by putting an extremely thin, grounded layer 41 of indium-tin oxide on a glass panel 42 which is then resin bonded to the faceplate portion 22 of the CRT. The shielding provided by the oxide layer 41 does a fairly satisfactory job of eliminating unwanted radiation from the area in front of the CRT, but is relatively expensive to implement due to the critical processing steps required.

Figure 3:
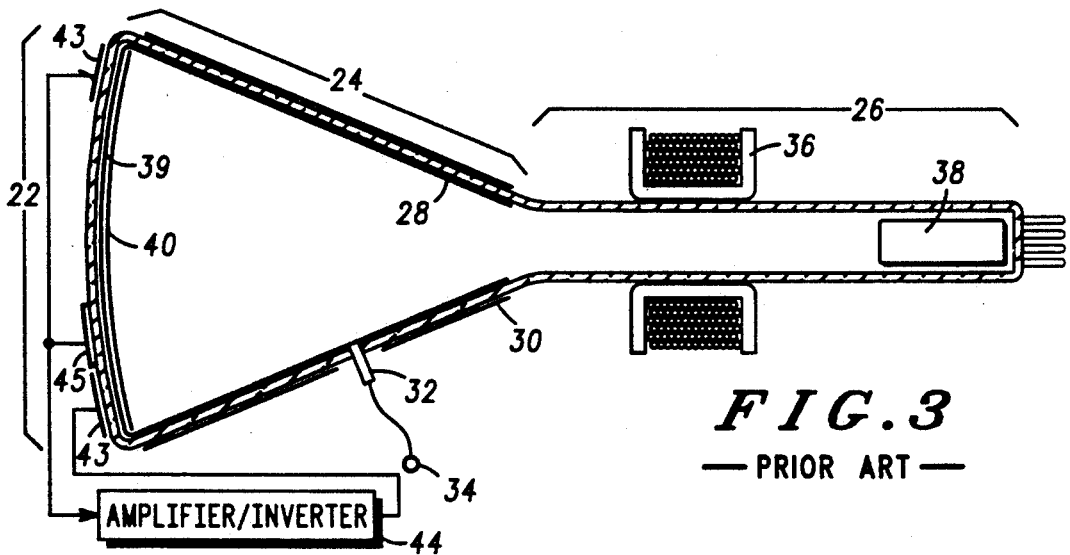
FIG. 3 is a diagram of another suggested radiation cancelling method.

FIG. 3 illustrates another known technique utilizing a CRT having essentially the same components as in FIG. 2, but lacking the glass panel 42 bearing the indium-tin oxide layer 41. In addition, the CRT has two copper foil radiators 43, preferably applied on or very near to the glass CRT envelope 20. The radiators 43 may be fed by an amplifier 44 which receives a signal sensed by a field sensor 45. The field sensor 45 picks up a signal from any electric field such as that generated by the voltage on the inner DAG coating 28 and anode button 32. The sensed and amplified field signal, when coupled to the radiators 43 will provide some reduction of an unwanted field and even cancellation at certain points, but it is acknowledged that the approximate cancellation may produce excessively large fields at other than the locations specified in the measurement protocols.

Figure 5:
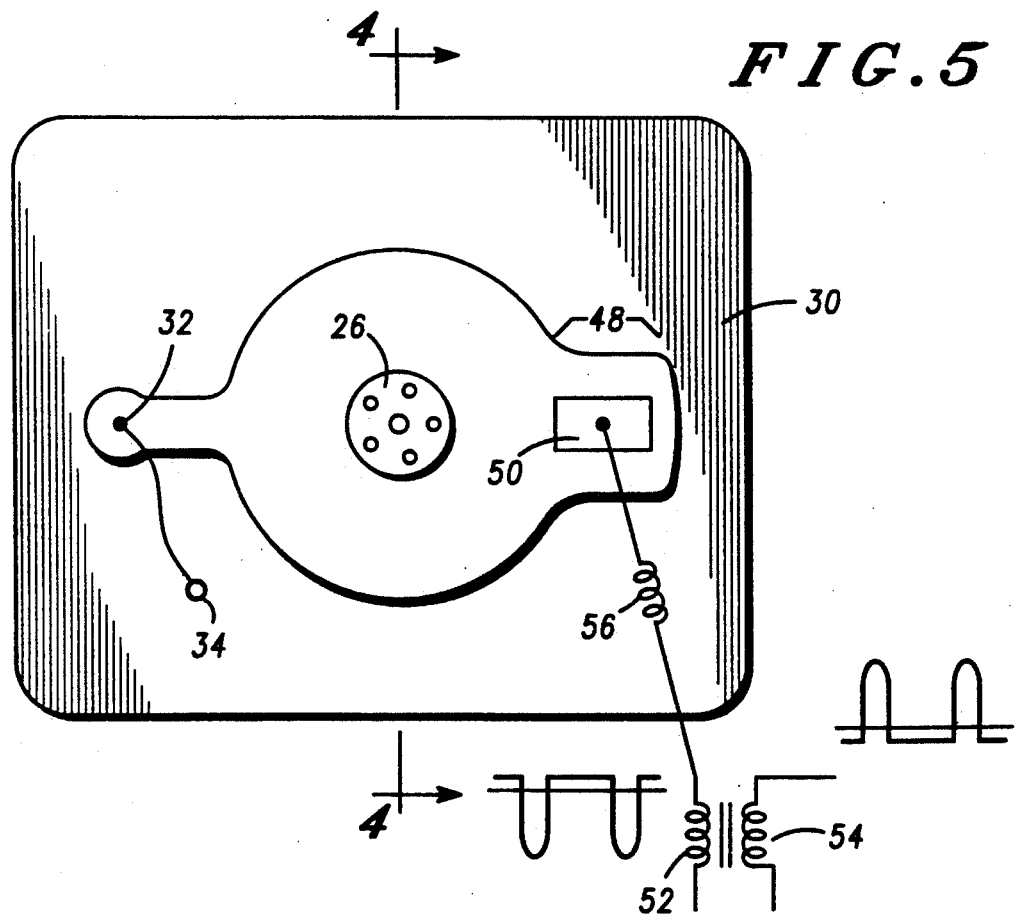
FIG. 5 is a rear view of the monitor tube of FIG. 4.
Figure 4:
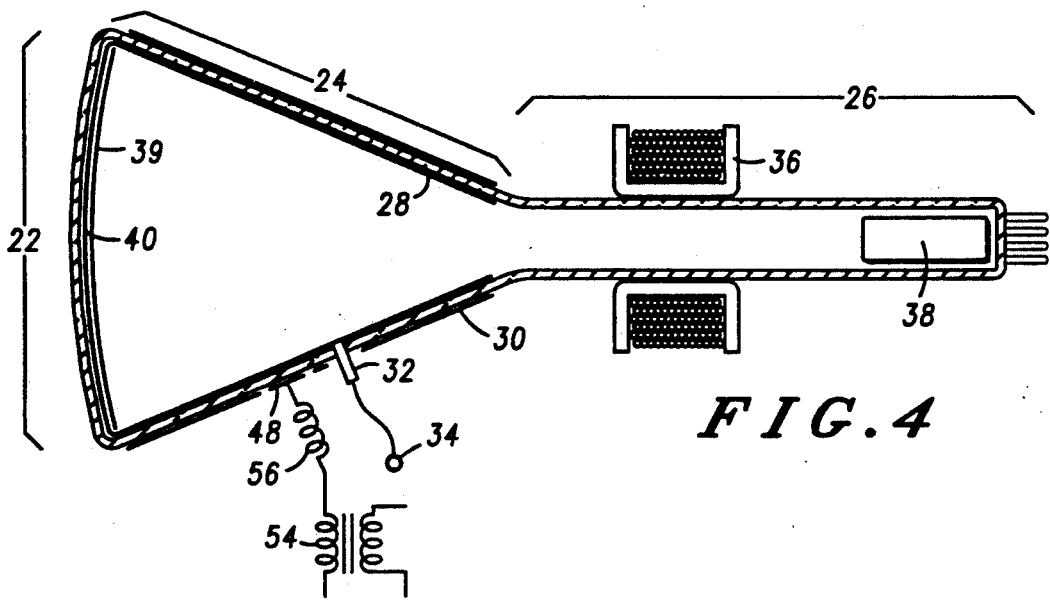
FIG. 4 is a diagram of a monitor tube showing the radiation prevention means of the present invention.

FIGS. 4 and 5 show the present invention and will be described together. FIG. 4 is a cutaway view of a CRT monitor and FIG. 5 is a rear view (neither view to scale). The tube has essentially the same components as the tube of FIG. 2, lacking only the glass panel 42 bearing the layer 41 of indium-tin oxide. Instead, a small area 48 of the outer DAG coating 30 on the funnel 24 is eliminated and a smaller conductive patch 50 is attached to the glass in the bare area. The size and position of the conductive patch 50 are not critical since the patch forms one plate of a coupling capacitance (see FIG. 6) having the inner DAG coating as the second plate.

Voltage pulses having opposite polarity and very similar or equal amplitude to the voltage pulses induced in the inner DAG coating 28 by the horizontal deflection voltage may be provided by a added winding 52 on a horizontal scan transformer 54. The voltage pulses thus provided will preferably be connected to the conductive patch 50 by way of a small coil 56 which prevents video RFI (radio frequency interference) from coupling to the CRT inner DAG coating 28 and causing radiated emissions in the RF band. The coil 56 is not necessary to the present invention for the prevention of the emitted electric field but is a practical protective measure. The cancellation voltage is capacitively coupled from the conductive patch 50 to the inner DAG coating 28, essentially cancelling the time-varying field in front of the faceplate 22 by cancelling the unwanted field generating voltage as its source.

Figure 6:
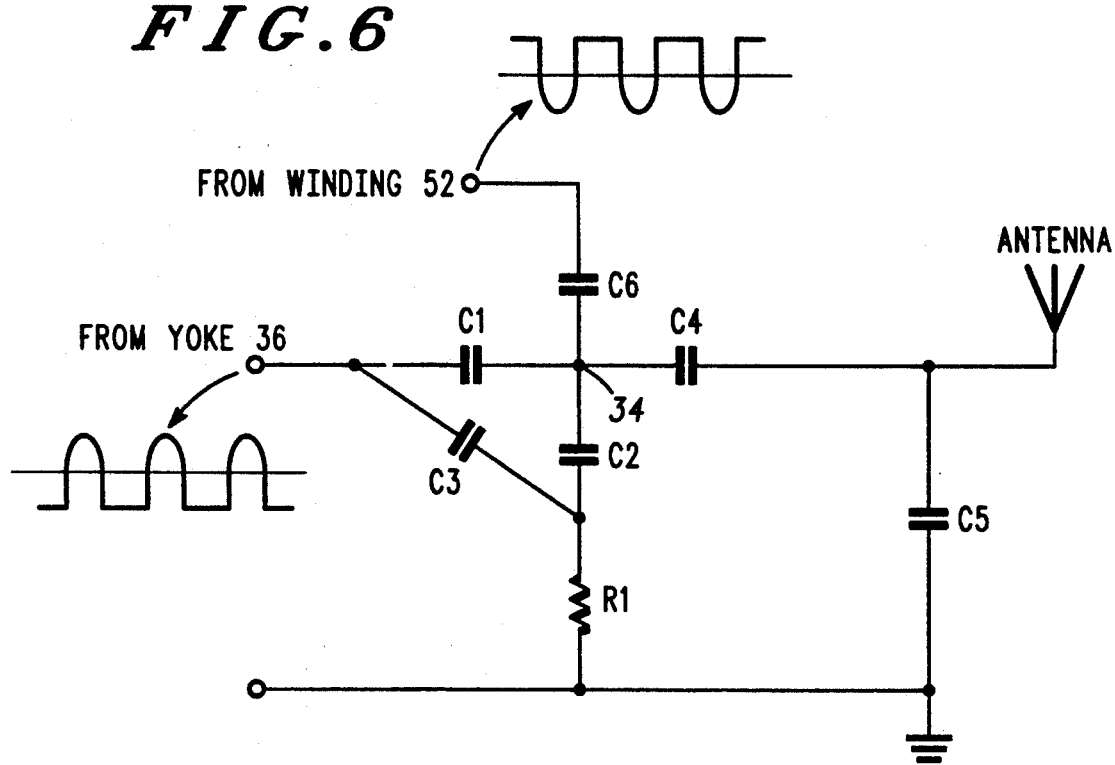
FIG. 6 is an equivalent circuit of the present invention.

FIG. 6 is an approximate equivalent circuit according to the invention. C-1 represents the capacitance from the yoke 36 and the leads of the yoke to the anode button 32 and the inner DAG coating 28 and aluminization, with the associated waveform. C-2 is the capacitance from the inner DAG coating 28 to the outer DAG coating 30. C-3 is the capacitance from yoke 36 to the outer DAG coating 30. R-1 is the sheet resistance of the outer DAG coating to ground. C-4 represents the combined capacitances from the anode button 32, the inner DAG coating 28 and aluminization on the faceplate 22 to the measuring antenna 12. C-5 is the capacitance of the antenna 12 to ground. C-6 is the capacitance from the conductive patch 50 to the anode button 32, the inner DAG coating 28 and aluminization, with the associated waveform. It will be apparent to those skilled in the art that if the two illustrated waveforms are essentially equal and opposite they will cancel each other at the inner DAG coating 28 and anode button connection 32. Since the voltage causing the unwanted electric field is cancelled at the source, there is no resultant field to be "cancelled" and no danger to anyone in the vicinity of the CRT.

Thus there has been shown and described a means of removing any possible dangerous electric field from the area near the front of a CRT, caused by the flyback pulses of the horizontal deflection voltage. The electric field is effectively eliminated by a voltage pulse essentially equal in magnitude and opposite in polarity to the pulse producing the unwanted electric field. The cancellation pulses are capacitively coupled to the inner DAG coating of the tube via a conductive patch on the outside of the tube. At the anode connection, the two pulses cancel each other, leaving no radiated field. Other variations of the present invention are possible and it is intended to cover all such as are included in the scope of the appended claims.

What is claimed is:

1. An electric field elimination system in a CRT device for cancelling any unwanted field generating voltage at the voltage source, the system comprising:
    voltage generating means coupled to the horizontal deflection circuitry for providing voltage pulses essentially equal in amplitude and opposite in polarity to the voltage pulses producing an unwanted electric field; and
    coupling means for coupling said provided voltage pulses from said generating means to the inner conductive coating of said cathode ray tube.

2. An electric field elimination system according to claim 1 wherein said voltage generating means includes an inductance coupled to the horizontal deflection circuitry of said CRT device.

3. An electric field elimination system according to claim 2 wherein said inductance is coupled to the scan transformer of the horizontal deflection circuitry of said CRT device.

4. An electric field elimination system according to claim 1 and wherein said coupling means includes conductive means attached to the outer wall of said CRT in an area devoid of conductive coating.

5. A electric field elimination system according to claim 4 and wherein said conductive means includes a portion of conductive foil.

6. An electric field elimination system according to claim 1 and wherein said coupling means includes conductive means attached to the outer wall of said CRT in an area devoid of conductive coating and opposite a portion of the inner coating of said CRT.

* * * * *